Patented Mar. 15, 1932

1,849,456

UNITED STATES PATENT OFFICE

ROBERT JOHN, OF LONG BRANCH, NEW JERSEY, ASSIGNOR TO AUTOMOTIVE PROCESS CORPORATION, A CORPORATION OF DELAWARE

COMPOSITION FOR MAINTAINING THE EFFICIENCY OF ENGINES

No Drawing.  Application filed February 23, 1927.  Serial No. 170,118.

This invention relates to a process for maintaining the efficiency of an internal combustion engine and to compositions of matter and articles of manufacture relating thereto.

For many years attempts have been made to improve the operation of internal combustion engines by adding to the fuel to be used in the engines various compounds which dissolve in the fuel and which are supposed to facilitate the burning of the fuel in the cylinders of the engines. All of these compounds, so far as I am aware, are supposed to react chemically with the fuel.

I have attacked the problem from an entirely new angle and introduce into the cylinders of the engine a substance which, so far as I am aware, does not react chemically with the fuel to facilitate oxidation and burning, but which exerts a physical effect on the carbon deposited in the cylinders which facilitates the removal of the carbon and prevents the formation of more carbon and its deposition on the walls of the cylinder. The formation and deposition of a large part of the carbon on the walls of the cylinders of internal combustion engines is due to the improper and incomplete burning of the gaseous mixture of vaporized fuel and air within the cylinders that is caused by a weak spark which does not properly ignite the charge. In some engines the proper ignition of the charge is facilitated by the use of a plurality of spark plugs in a single cylinder. In other engines attachments are used on the spark plugs or ignition system to insure a "fat" spark of full intensity. It is well recognized that carbon does not deposit as quickly in an engine which runs with clean plugs which give a "fat" spark, as it deposits in engines in which the spark plugs are dirty or carbonized so that only a small or "lean" spark is formed. Therefore, if a fat spark can constantly be obtained the formation and deposition of carbon in the cylinders will be much reduced or practically eliminated.

My invention assures a fat spark of full intensity by introducing into the cylinder of an internal combustion engine a substance which, under the conditions existing in the cylinder, deposits on the surfaces of the plug which are exposed to the explosive gases, and which is electrically insulating. In case the spark plug is new the substance deposits on the porcelain and the walls of the metal shell of the plug and prevents the leakage of electricity from the central electrode of the spark plug over the porcelain to the metal shell which is grounded. In order to understand the action of the substance in insulating a plug which has been coated with carbon it should be understood that when a clean plug is becoming coated with carbon, the carbon first deposits on the plug in back of the tips of the electrodes where the plug is relatively cool and on the portions of the plug, both the porcelain and metal shell, which are fully exposed to the fresh gases at each explosion in the cylinder. The carbon deposits gradually extend farther and farther up into the space between the porcelain of the plug and the outer metallic shell until finally the deposit of carbon becomes so thick that it almost bridges the gap between the porcelain and the shell. When the plug is in this condition the plug is so nearly short circuited that the spark does not jump between the points of the electrode, but rather jumps between the carbon on the porcelain and the carbon on the shell and this spark, in addition to being lean, is within the plug where it cannot effectively ignite the charge within the cylinder. When a plug is in this condition and the substance which I use in my invention is introduced into the cylinder, an insulating compound coats the carbon which has been deposited on the exposed portions of the plug and prevents the passage of electricity from the carbon deposited on the porcelain of the plug to the metal shell, or to the carbon which is deposited on the shell, and forces the spark to jump between the points of the electrodes which properly ignites the charge in the cylinder.

The substance which I use also assists in removing the carbon which is deposited on the walls of the cylinder and on the piston head and on the exposed portions of the body of the spark plug. I believe that this is not due to a chemical reaction with the carbon, because I have discovered that if the substance is introduced into the cylinders of an engine which contain the usual coating of hard caked carbon and the engine is run, the carbon becomes porous and rather light and fluffy so that it may it may easily be removed by light scraping. For instance, if a plug which is badly coated with carbon is used in a cylinder into which the substance is introduced, the first noted effect is that the plug begins to fire very regularly and then, after continued operation for several hours, the upper surface of the caked carbon on the plug becomes so light and fluffy that it may easily be scraped off. After further operation more of the carbon becomes light and fluffy and may be scraped off until, after several runs, all of the carbon may easily be removed. Where the carbon which has become light and fluffy is not scraped off after each run, but the engine is operated for several hours a day, I find that substantially all of the carbon on the plug and the walls of the cylinder has disappeared in the course of from 1 to 2 weeks, depending upon the thickness of the coating of carbon.

With this preliminary statement of my invention, I will describe its use and the preparation of the substance which I use. Further objects and features of my invention will more fully appear from the following description and will be pointed out in the claims.

The substances which I have effectively used to obtain the desired results are oxides of antimony. There are two oxides of antimony namely, the trioxide $Sb_2O_3$ and the tetroxide $Sb_2O_4$, both of which are probably present in the cylinder of the engine and each of which plays its own part in effecting the results which I obtain by their use. The trioxide of antimony is a white fusible solid, slightly soluble in water and volatile at a red heat. On heating in air it becomes oxidized to the tetroxide and is then non-volatile.

I may introduce the oxides of antimony into the cylinders of the engine in any suitable manner, for instance by introducing them into the intake manifold of the engine as powders, but they are most easily introduced into the cylinders of the engine by incorporating in the fuel for the engine another compound of antimony which under the conditions existing in the cylinders of the engine forms the oxides. For the purpose of getting the antimony compounds into the cylinders of the engine I dissolve one pound of anhydrous crystals of antimony trichloride in 16 ounces of fusel oil of the specifications given in the Dispensatory of the United States of America, 19th edition, page 381. The fusel oil is almost entirely amyl alcohol. The antimony trichloride dissolved in the fusel oil gives a clear solution. To this solution of one pound of antimony trichloride in 16 ounces of fusel oil are added 16 ounces of gasoline of the specification described as automobile fuel adopted by the United States Government Inter-Department Petroleum Specification Committee on October 31, 1922. Upon the addition of the gasoline to the antimony trichloride dissolved in fusel oil, a reddish brown solution is formed which becomes darker upon exposure to light. This solution is somewhat acidic as is shown by testing it with litmus paper and probably contains a mixture of the sulphides of antimony and oxides of antimony and the chlorides of antimony, the brown color being due to the sulphides. Two cubic centimeters, or 34 minims, of this strong solution are added to each gallon of gasoline in the gasoline tank from which the gasoline is drawn for use in the internal combustion engine. Upon the addition of the strong solution to the large body of gasoline in the proportion of two cubic centimeters of the strong solution to a gallon of gasoline, the gasoline becomes cloudy with a white substance and the liquid takes on a reddish purple color. The white substance is probably the trioxide of antimony and the purple color probably denotes the formation of another sulphide or oxysulphide of antimony which is dissolved in the fuel mixture. This solution is still somewhat acidic, but only slightly so and the cloudiness is due to a suspension of a solid substance or mixture of substances in the gasoline. The solids are probably in the gasoline as a colloidial suspension because they do not separate out and do not clog the pipe line nor the carburetor through which the fuel passes.

When the gasoline containing these antimony compounds is burned in the cylinders of an internal combustion engine, a white substance is deposited on those parts of the cylinder and spark plug which are exposed to the gases except that there is no deposit on the points of the electrodes of the spark plug between which the spark jumps when the plug is firing due to the fact that the flame of the spark forces the gases away from the points of the electrodes. This white deposit is probably a mixture of the trioxide and the tetroxide of antimony. When the engine is cold as it is when it is first started, and a charge of air and vaporized gasoline containing the antimony compounds is drawn into the cylinder and the charge is fired. I believe that the trioxide of antimony is first formed and the particles thereof are driven into the carbon deposits which are within the cylinders. As the engine heats up, as it does after running a suitable length of time, I believe that the trioxide of antimony is volatilized and oxidized to the tetroxide of antimony. The volatilization of the trioxide of antimony leaves the carbon in which it was first lodged, that is, the exposed layer of the carbon, more or less porous and light and fluffy so that it may quite easily break away from the mass of deposited carbon and pass out of the cylinder with the exhaust. Some of the antimony trioxide which is thus volatilized and changed into the tetroxide passes out of the cylinder with the exhaust gases, but other portions of the tetroxide redeposit on the carbon and remain there. After the antimony compounds have been used in the engine for a week or two the caked carbon disappears and no more carbon forms so long as the fuel containing the antimony compounds is used. This is probably due to the fact that after the caked carbon has been removed, the antimony trioxide deposits in any newly formed particles of carbon and then volatilizes from them leaving the carbon light and fluffy so that it passes out of the cylinder with the exhaust. In this way the oxides of antimony prevent the carbon formation in the cylinder.

Both the trioxide and the tetroxide of antimony are electrically insulating and this property is of especial importance when they are deposited on those parts of the spark plug which are exposed to the gases of the charge and over which or through which the electricity must pass to escape forming the spark between the electrodes. As previously stated in this specification, the spark will only occasionally jump between the points of the electrodes when the carbon deposits on the metal shell and the porcelain of the plug have extended so far up into the plug that the electricity finds a path of equal or less resistance through the carbon deposits, than across the gap between the points of the electrodes. When the plug is thus carbonized and the spark does not jump between the points of the electrodes but jumps between the carbon on the porcelain of the plug and that on the shell, the spark is very lean and does not ignite the charge in the cylinder with sufficient energy to cause the combustion of the entire charge and as a result of the incomplete combustion more carbon is deposited on the shell and porcelain. When the trioxide of antimony works into the deposited carbon it increases the electrical resistance of the carbon because the non-conducting crystals of antimony oxide are interposed between the particles of carbon. Also the deposits of the oxides of antimony on the carbon form an electrically insulating layer over the deposited carbon which prevents the jumping of the spark between the carbon on the porcelain and that on the shell and thus prevents the short circuiting of the plug. This forces the spark to jump between the points of the electrodes as it should do and also prevents the leakage of electricity through the carbon on the plug thereby producing a spark of full intensity and assuring the correct ignition of the charge. The following experiment has been performed to substantiate this. All of the cylinders except one, of an internal combustion engine, were rendered inoperative by disconnecting the wires leading to the spark plugs and the engine was run with the single cylinder using a spark plug badly coated with carbon until it became evident that the plug was not firing regularly. This plug was then removed and put in a testing machine so that the jump of the spark could be noted and it was found that the spark only occasionally jumped between the points of the electrode and at other times jumped between the carbon on the porcelain and the carbon on the metallic shell. When the spark jumped between the carbon on the porcelain and the shell the spark formed up in the plug where the porcelain is close to the metallic shell. The plug was then reinserted into the engine and the engine run as before using gasoline prepared as previously described and after running for several minutes the explosions within the cylinder were regular and of full intensity. The plug was then removed from the engine and reinserted in the testing machine and every time that potential was applied to the plug the spark jumped between the electrodes and did not jump between the carbon on the porcelain and the metallic shell. This action was due to the fact that the substance which was deposited on the carbon of the plug effectively insulated the carbon on the porcelain from that on the shell.

The following experiments also indicate that the substance deposited on the interior of the cylinder by the use of my fuel, is electrically insulating. I placed a 220 V. 100 W. lamp in series with a pair of terminals and connected the wire from one terminal and from the lamp to a 220 V. source of electrical energy. I then placed the two terminals in spaced position on the carbon deposited on the porcelain of a spark plug and the lamp lighted. I then ran an automobile engine using a fuel prepared in accordance with the directions given above and using, in one of the cylinders, the spark plug under test. After running the engine a short while the plug was removed and tested as before with the 220 V. lamp but the lamp would not glow showing that the substance which was deposited on the carbon was electrically insulating.

The same result has been obtained by testing the metal of the shell of new and cleaned spark plugs both before and after running them in an engine using the above described fuel. Before running the plugs they were tested with the lamp and terminals and of course when the terminals were placed on the bare metal the lamp lighted. But after running the plugs in the engine and using the fuel treated as described above, until a thin white coating had deposited on the metal and then touching the terminals on this coating the lamp would not glow thus showing the effective insulating properties of the substance deposited.

I have made another experiment with carbonized spark plugs testing them before and after use in an engine burning the fuel prepared as hereinbefore described. A spark plug having a coating of carbon which was deposited on the plug during the use of the plug in an internal combustion engine which was burning ordinary gasoline, was inserted within an air tight glass walled container which had means for applying a sufficient potential to the terminals of the plug to cause a spark to jump between the points of the electrodes and also had means for increasing or decreasing the pressure of air within the container. Upon applying a potential of 10,000 volts to the terminals of the plug while the plug was in the container and the air in the container was at atmospheric pressure, the spark jumped between the terminals of the electrodes. The spark continued to jump between the terminals of the electrodes, until the pressure of air within the cylinder mounted to 35 pounds per square inch. A milliammeter in series with the plug under test showed a current of 7 milliamperes passing through the plug at atmospheric pressure and there was no appreciable decrease in the amount of current until the pressure within the container became approximately 35 pounds. When the air pressure in the container became greater than 35 pounds the spark did not jump between the terminals of the electrodes of the plug but occurred between parts of the carbon coated porcelain of the plug and the shell and when the pressure of air within the container increased to approximately 50 pounds per square inch no spark whatever occurred. As the air pressure was increased within the container above 35 pounds and the spark occurred between the carbon coating on the porcelain of the plug and the metal shell, the reading of the milliammeter decreased until the air pressure became approximately 50 pounds to the square inch at which time the spark ceased altogether and the milliammeter gave no reading. When the spark ceased, at which time the pressure of air within the container was a little above 50 pounds per square inch, the pressure was gradually reduced and a slight spark occurred between the carbon on the porcelain of the plug and the metal shell of the plug when the air pressure within the container dropped to approximately 50 pounds. This spark was well up within the shell of the plug and the milliammeter registered the passage of a slight current. After the air pressure within the container was further reduced, the milliammeter showed the passage of an increased amount of current until at approximately 35 pounds pressure the spark again occurred between the terminals of the electrodes and the spark continued to jump between the terminals of the electrodes as the pressure within the container was reduced to atmospheric pressure. The spark plug was then removed from the glass container and used in an automobile engine which was operating under a suitable load and at the usual engine speed and burning a fuel prepared as hereinbefore described. The engine was operated until approximately 100 cubic centimeters of the fuel were consumed which represented a travel of something less than one-half mile in an automobile employing such an engine under ordinary running conditions. The plug gave a better performance when the engine was running with the fuel disclosed herein than it did when the engine was running with ordinary gasoline. The plug was then removed from the engine and placed within the glass container when the previously described tests were repeated. In these tests as the air pressure within the container was increased the spark continued to jump between the terminals of the electrodes until the pressure of air within the container became approximately 125 pounds to the square inch and the milliammeter showed the passage of approximately 7 milliamperes even under increased pressure within the container. When the air pressure within the container reached approximately 125 pounds to the square inch, the spark ceased to jump between the terminals of the electrode and it did not jump at any other point in the plug and the milliammeter showed that no current was passing. This test showed conclusively that the fuel prepared as disclosed herein effectively insulates from each other the electrodes of the spark plug.

It will therefore be understood how the antimony compounds insulate the electrodes of both the carbonized and the uncarbonized plugs. In the case of the carbonized plug the substance deposits over the carbon and insulates the carbon on the porcelain from that on the shell. In the case where a new plug is used, the substance deposits on the exposed parts of the plug and then if any carbon deposits it does so over the layer of antimony compound which insulates the carbon from the electrode and thus effects the insulation of the electrodes. This condition sometimes arises where treated fuel is first used and then untreated fuel is used. The treated fuel deposits the oxides of antimony which insulate the electrodes and the untreated fuel later deposits the carbon. Thus by using the treated fuel and obtaining an insulating coating the plug should give good results indefinitely. This actually happens and it has been found by experience that after using the treated fuel for a period of time, untreated fuel can be used and the plug fires regularly. The effect finally wears off however, and upon examining the plug after the effect has worn off, it is found that the insulating coating has disappeared on those parts of the plug which are most exposed to the passage of the gaseous charge over them. The gases gradually carry away the antimony oxide and where this happens the carbon contacts with the electrode and causes the plug to misfire.

I claim:

1. A material to be added to a fuel for an internal combustion engine for preventing the deposition of carbon in the cylinder of the engine including antimony trichloride and fusel oil.

2. A material to be added to a fuel for an internal combustion engine for eliminating carbon deposits in the cylinder of the engine including antimony trichloride in amyl alcohol.

3. A material to be added to a fuel for an internal combustion engine for eliminating carbon deposits in the cylinder of the engine including a compound containing antimony and chlorine and fusel oil.

4. A material to be added to a fuel for an internal combustion engine for preventing the deposition of carbon in the cylinder of the engine including a compound containing antimony and chlorine and amyl alcohol.

5. A composition of matter including antimony trichloride and fusel oil.

6. A composition of matter including antimony trichloride dissolved in amyl alcohol.

7. A composition of matter including a compound containing chlorine and antimony and fusel oil.

8. A fuel comprising a hydrocarbon into which there has been incorporated antimony trichloride and fusel oil.

9. A fuel comprising a hydrocarbon into which there has been incorporated antimony trichloride and amyl alcohol.

10. A fuel comprising a hydrocarbon into which there has been incorporated a compound containing antimony and chlorine in amyl alcohol.

11. A fuel comprising a hydrocarbon into which there has been incorporated a compound containing antimony and chlorine in fusel oil.

12. A fuel comprising gasoline, fusel oil and antimony trichloride.

13. A fuel comprising gasoline, fusel oil and a chloride of antimony.

14. A fuel comprising gasoline, fusel oil and antimony trichloride in the ratio substantially of 1 gal. of gasoline to 2cc. of a solution of 1 lb. of antimony trichloride in 16 oz. of fusel oil and 16 oz. of gasoline.

15. A fuel comprising gasoline, fusel oil and a chloride of antimony in the ratio substantially of 1 gal. of gasoline to 2 cc. of a solution of 1 lb. of a chloride of antimony in 16 oz. of fusel oil and 16 oz. of gasoline.

In testimony that I claim the foregoing, I have hereunto set my hand this 16th day of February, 1927.

ROBERT JOHN.